United States Patent [19]

Legler

[11] 3,739,092

[45] June 12, 1973

[54] TELEVISION SIGNAL BLANKING

[75] Inventor: Ernst Legler, Seeheim, Germany

[73] Assignee: Fernseh GmbH, Darmstadt, Germany

[22] Filed: Sept. 2, 1971

[21] Appl. No.: 177,346

[30] Foreign Application Priority Data

Sept. 8, 1970 Germany .................. P 20 44 352.1

[52] U.S. Cl. ........ 178/7.1, 178/7.3 R, 178/7.3 DC, 328/158

[51] Int. Cl. ............................................ H04n 5/14

[58] Field of Search .................. 178/7.1, 7.2, 7.3 R, 178/7.3 DC, 7.5 R, 7.5 DC, DIG. 26; 328/158, 165, 187, 172, 173; 330/11

[56] References Cited

UNITED STATES PATENTS

| | | | |
|---|---|---|---|
| 3,076,150 | 1/1963 | Rozner | 330/11 |
| 3,379,826 | 4/1968 | Gray | 178/DIG. 26 |
| 3,472,957 | 10/1969 | Kaye et al. | 178/7.1 |
| 3,571,508 | 3/1971 | Van Roessel | 178/7.1 |

*Primary Examiner*—Robert L. Griffin
*Assistant Examiner*—George G. Stellar
*Attorney*—Carroll B. Quaintance, James H. Littlepage, James C. Wray et al.

[57] ABSTRACT

A television signal to be blanked is supplied to an input transistor of a first cascade; a variable D-C is supplied to a base of an input transistor in a second cascade. Each cascade has two output transistors, with nullers connected to the input transistors. A base of one output transistor in each cascade is supplied with a blanking pulse; bases of the other output transistors are held at a reference voltage. A ballast resistor is connected across outputs in each cascade, and a blanked signal is taken from a difference amplifier supplied by like-biased output transistors.

6 Claims, 8 Drawing Figures

Inventor:
Ernst Legler
by James C. Wray
Attorney

TELEVISION SIGNAL BLANKING

BACKGROUND OF THE INVENTION

The invention is a blanking circuit. In general, such circuits remove at prescribed time intervals signals belonging to a given signal sequence. Widely used in TV are blanking circuits which suppress the picture signal during flyback of the electron beam and create a certain level for the synchronization signals.

In the usual circuits of this type the blanking effect is accomplished by adding to the, say, positive video signal a negative signal whose instantaneous amplitude is larger than the strongest video signal; then, the resulting composite signal is suppressed at a reference level, the reference black level for instance, by means of an amplitude limiter. This way the signal components existing during the blanking pulse period are removed and replaced by the reference potential.

In black and white Tv this method of blanking has proved to be very satisfactory. But in color TV it is useless. For the negative half-cycles of the chrominance subcarrier remain considerably below the blanking level imposed by the international standards; hence, these half-cycles cannot be removed by the limiter. Therefore, the need arose to have the signal divided into luminance component and a chrominance component. The separation has the advantage that the luminance component can be removed by the usual method applied in black and white TV, but the chrominance component has to be taken care of by special processes.

Attempts to have the suppression take place during the blanking period were unsuccessful mainly because the operation of the suppressor caused noise peaks in excess of the extremely low noise peaks (0.3 percent) permitted for camera work.

In view of this, the invention gives a blanking circuit which is very useful for color TV work, for it attains a noise-free blanking level within the amplitude spectrum of TV signals.

SUMMARY OF THE INVENTION

Specifically, the invention permits blanking of signals in general and of color TV signals with color carrier in particular by means of blanking pulses as follows: there are two cascade circuits. Each cascade employs a signal input transistor and two emitter-coupled output transistors. In one of the two cascade circuits the base of the input transistor receives the signal to be blanked at the desired signal level. The blanking pulse sequence is introduced in the base electrode of one output transistor in each cascade circuit. The base of the other output transistor in each cascade lies at reference potential. The two output transistors receiving the blanking pulses receive during the blanking period the current of the input transistor, but between the blanking periods they receive no current at all. Inversely, the other output transistor in each cascade circuit receives no current during the blanking period, but outside this period they receive in full the current of the input transistors. Additionally, the input transistor of the other cascade (the input transistor that does not receive the signal to be blanked out) functions as a source of purely constant-current. Finally, the output signals are taken with the help of two identical ballast resistors from the collectors of the two output resistors whose base electrodes are similarly driven. The output signals coming from the collectors of the two output transistors are then introduced into a difference amplifier. The signal with the desired blanking level appears at the output of this amplifier.

The advantage of this circuit arrangement is that, by properly selecting among the idling or quiescent currents offered by the input transistors, one can achieve any desired level of blanking within, or outside, the amplitude of the useful signal. The magnitude of the idling currents has no influence upon the signal appearing at the output of the difference amplifier, only the difference between the idling currents is of consequence in this respect.

Other details and advantages of the invention are shown in the following description in which reference is also made to the attached diagrams.

DETAILED DESCRIPTION OF THE DRAWING

Figures 1A, 1B, 1C, 1D:
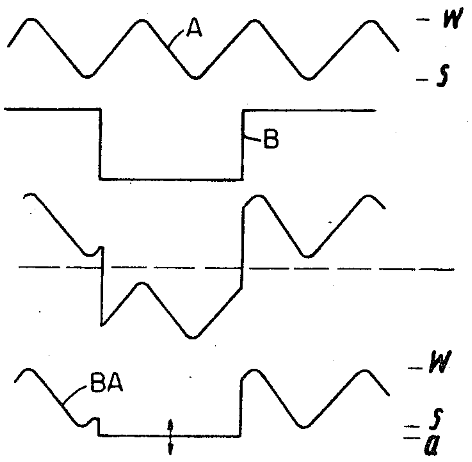
FIG. 1*a*–1*d* shows four signal sequences which serve to describe the usual blanking method.

In black and white TV camera equipment the signal has the form shown in FIG. 1 with a white amplitude W and a black amplitude S. In order to achieve a blanking level the picture signal is mixed with a blanking signal B, whose amplitude is larger than the black and white signal amplitude. The resulting composite signal is shown in FIG. 1*c*. Suppressing at an amplitude given by the broken line, the BA signal is achieved, that is, the picture signal W–S and the blanking level a, as per FIG. 1*d*.

With this process all signal components which remain below the blanking level are removed outside the blanking period. This is permitted in black and white Television, but not in color television where the negative half-cycles of the modulated color-subcarrier can remain considerably below the blanking level without being removed.

The invention offers a solution to this problem. In the circuit shown in FIG. 2 each cascade 1-2-3 and 1'-2'-3' consists of an input transistor 1 and 1' and output transistors 2, 3 and 2' and 3'. The emitters of these output transistors are connected to the collectors of transistors 1 and 1'.

The base electrodes of transistors 2 and 2' receive a rectangular driving signal under whose influence they conduct during the blanking period and remain in an off state outside the blanking time. The base electrodes of transistors 3 and 3' lie at a constant reference level, preferably at ground potential.

At the base of input transistor 1 we have the picture signal which generates an idling current I, modulated set on amplitude *i*. At the base of transistor 1' there is a constant voltage which generates an idling current I2. The collectors of the not driven transistors 3 and 3' are connected to high voltage through ballast resistors. Signals taken at these resistors are applied to difference amplifier 6.

When transistors 2 and 2' are conducting under the influence of the blanking pulse, they absorb fully the current coming from transistors 1 and 1'. This means that during the blanking time transistors 3 and 3' are in an off state, and so there appears a difference signal 0 at both inputs of the difference amplifier 6.

During all other times, transistors 2 and 2' are cut off by the signal at point A. Through transistor 3 flows then, depending on the voltage at B, an AC current $i$ and an idling current I1. Through transistor 3' flows only an idling current I2. The collector signals corresponding to these currents are mutually subtracted in the difference amplifier, so that the output signal is formed according to the expression $I+i-I2$. When $I1 = I2$ the blanking level lies at the zero points of the AC current. In the case where the idling currents have different values, the blanking level changes according to the difference and its sign. Accordingly, we obtain the two signal forms shown in FIG. 2 next to the circuit diagram. In the case of a current having a sine-form at point B, and the idling currents in the two cascades have the same value, the blanking level lies at the level of the zero points of the sine-current. When the idling currents have different values the blanking level lies asymmetrically in respect to the amplitude of the sine-current.

Figure 2:
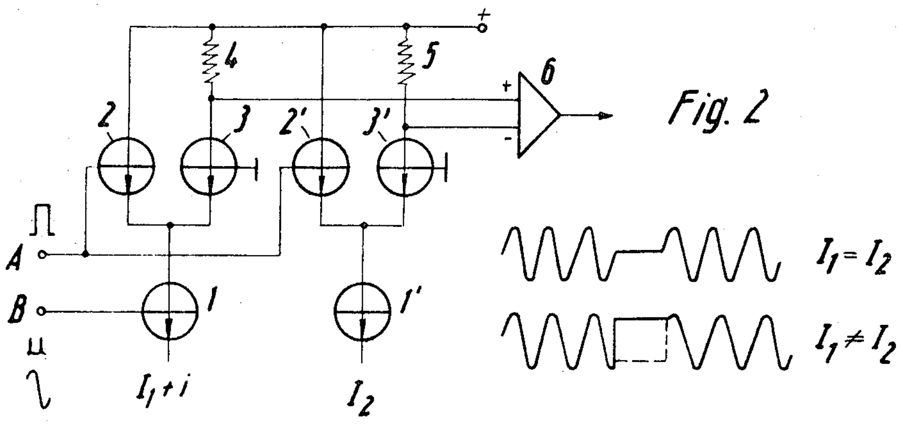
FIG. 2 shows a basic circuit and the signal sequences at its inputs and at its output, according to the invention.
Figures 3, 3A:
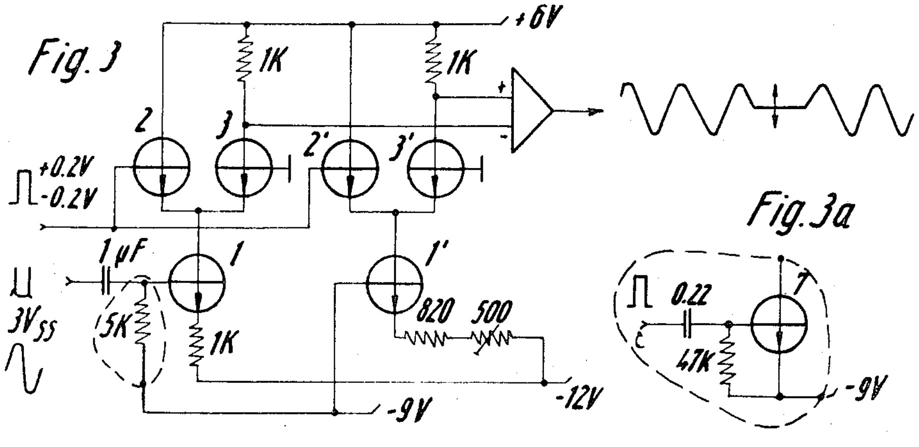
FIGS. 3 and 3*a* shows practical examples of the invention together with a variation of the invented circuit.

FIG. 3 shows the circuit of FIG. 2 in detail. The circuit components are given rather large values. In the emitter circuit of transistor 1' there is a fixed resistor of 820 ohms next to a variable resistor of 500 ohms. The blanking level can be changed by adjusting the variable resistor.

When TV signals are amplified, it is usually necessary to clamp the signal at a predetermined level. This clamping can be effected by removing the load resistor (5KΩ) at the base of transistor 1 and connecting there a circuit such as the one shown in FIG. 3*a*. In this figure the clamping pulse appears when the signal attains a certain reference level and is applied to the base of a transistor 7 over a condenser C of 0.22MF capacitance. During the clamping period this capacitor connects the base of transistor 1 at the base bias potential of –9V, at which potential also the base of transistor 1' lies.

Figure 4:
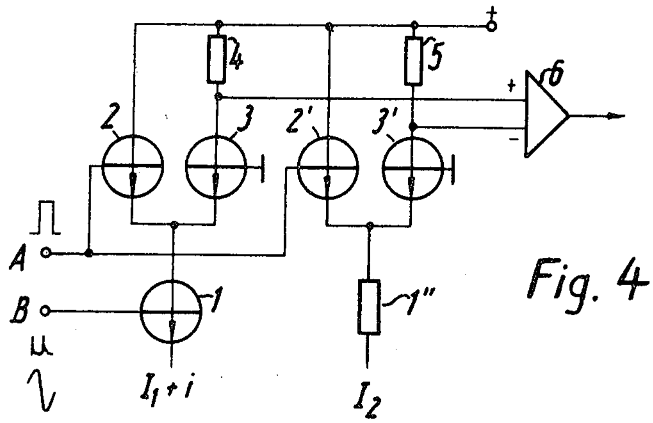
FIG. 4 shows a minor modification of the basic circuit of FIG. 2.

Other variations of the circuit are possible without deviating from the basic idea that led to this invention. For example, transistor 1' of the DC cascade can be replaced by a resistor 1'' as shown in FIG. 4.

While the invention has been particularly shown and described with reference to a preferred embodiment thereof, it will be understood by those skilled in the art that various changes in form and details may be made therein without departing from the spirit and scope of the invention.

What is claimed is:

1. A blanking circuit for suppressing signals with blanking voltage, comprising a signal source, a blanking voltage source, first and second cascade circuits, each cascade circuit having an input transistor and two output transistors having inputs connected to the input transistor of the cascade, a base of an input transistor of one cascade connected to the signal source, a base of an input transistor of the other cascade connected to a source of constant current, base electrodes of one output transistor in each cascade connected to the blanking source, bases of the other output transistors connected to a reference voltage, whereby the first mentioned output transistors transmit full current from the input transistors during the blanking periods and are off between blanking periods, and whereby the other output transistors of each cascade are off during blanking periods and transmit current from the input transistor between blanking periods, a difference amplifier connected to outputs of two output transistors having like base connection, whereby a blanked signal appears at an output of the amplifier.

2. The blanking circuit of claim 1 further comprising a ballast resistor connected between outputs of output transistors in each cascade.

3. The blanking circuit of claim 1 in which output signals are taken from that transistor of each cascade whose base electrode is at the reference voltage.

4. A circuit as per claim 1 wherein the constant current source is adjustable, whereby DC current of the input transistor of one of the two cascades can be adjusted permitting thus a variation of the blanking level.

5. The circuit of claim 1 further characterized by a circuit means connected to bases of the input transistors re-introducing the DC component, when video signals appear at the input of said one cascade.

6. A blanking circuit for suppressing signals with blanking voltage, comprising a signal source, a blanking voltage source, first and second cascade circuits, one cascade circuit having an input transistor and two output transistors having inputs connected to the input transistor, a base of the input transistor being connected to the signal source, the other cascade circuit having a resistor with two terminals and two output transistors having inputs connected to one terminal of the resistor, base electrodes of one output transistor in each cascade being connected to the blanking source, bases of the other output transistors being connected to a reference voltage whereby the first mentioned output transistors transmit full current during the blanking periods and are off between blanking periods, and whereby the other output transistors of each cascade are off during blanking periods and transmit current between blanking periods, a difference amplifier connected to outputs of two output transistors having like base connection, whereby a blanked signal appears at an output of the amplifier.

* * * * *